United States Patent
Ishikawa et al.

(10) Patent No.: US 10,442,046 B2
(45) Date of Patent: Oct. 15, 2019

(54) TELESCOPIC COVER

(71) Applicant: FANUC CORPORATION, Yamanashi (JP)

(72) Inventors: Ryuutarou Ishikawa, Yamanashi-ken (JP); Akihiko Fujimoto, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/984,474

(22) Filed: May 21, 2018

(65) Prior Publication Data

US 2018/0339384 A1    Nov. 29, 2018

(30) Foreign Application Priority Data

May 24, 2017   (JP) ................................ 2017-102397

(51) Int. Cl.
  *B23Q 11/08*   (2006.01)
  *E05D 15/06*   (2006.01)
  *E05F 11/46*   (2006.01)

(52) U.S. Cl.
  CPC .......... *B23Q 11/0825* (2013.01); *E05D 15/06* (2013.01); *B23Q 2011/0808* (2013.01); *E05D 15/0621* (2013.01); *E05F 11/46* (2013.01); *E05Y 2201/624* (2013.01); *E05Y 2800/122* (2013.01); *E05Y 2900/608* (2013.01)

(58) Field of Classification Search
  CPC .................... B23Q 11/0825; B23Q 2011/0808
  See application file for complete search history.

(56) References Cited

U.S. PATENT DOCUMENTS

| 1,832,966 | A | * | 11/1931 | Cook | ...................... | E06B 3/925 |
| | | | | | | 160/138 |
| 3,824,890 | A | * | 7/1974 | Zettler | ............... | B23Q 11/0816 |
| | | | | | | 144/251.1 |
| 4,039,021 | A | * | 8/1977 | Moritz | ............... | B23Q 11/0825 |
| | | | | | | 160/202 |
| 5,169,223 | A | * | 12/1992 | Suzuki | ............... | B23Q 11/0825 |
| | | | | | | 160/202 |

(Continued)

FOREIGN PATENT DOCUMENTS

| CN | 101961842 A | 2/2011 |
| JP | 63-019993 U | 2/1988 |

(Continued)

OTHER PUBLICATIONS

English Abstract and Machine Translation for Japanese Publication No. 07-214455 A, published Aug. 15, 1995, 9 pages.

(Continued)

*Primary Examiner* — Justin B Rephann
(74) *Attorney, Agent, or Firm* — Fredrikson & Byron, P.A.

(57) ABSTRACT

First and second V-shaped link structures are arranged in an overlapping manner such that a first fixed pin and a second fixed pin of the first V-shaped link structure are positioned relative to a movable pin to one side with respect to the direction parallel to the longitudinal direction of a guide rail while a first fixed pin and a second fixed pin of the second V-shaped link structure are positioned relative to a movable pin to the side opposite to that in the first V-shaped link structure.

2 Claims, 2 Drawing Sheets

(56) References Cited

U.S. PATENT DOCUMENTS

| | | | | |
|---|---|---|---|---|
| 5,560,415 A * | 10/1996 | Geissler | ............ | B23Q 11/0825 160/220 |
| 6,419,002 B1 * | 7/2002 | Wang | ................ | B23Q 11/0825 160/202 |
| 6,488,072 B1 * | 12/2002 | Wang | ................ | B23Q 11/0825 160/222 |
| 7,600,552 B2 * | 10/2009 | Wu | .................... | B23Q 11/0825 160/222 |
| 2002/0172570 A1 * | 11/2002 | Tsurumaki | ......... | B23Q 11/0825 409/134 |
| 2006/0102296 A1 * | 5/2006 | Wu | .................... | B23Q 11/0825 160/223 |
| 2010/0219600 A1 | 9/2010 | Dada | | |
| 2011/0017410 A1 * | 1/2011 | Yamashita | ......... | B23Q 11/0825 160/222 |
| 2014/0083244 A1 * | 3/2014 | Segawa | ............. | B23Q 11/0825 74/608 |
| 2018/0143162 A1 * | 5/2018 | Kurokami | .............. | G01N 29/14 |

FOREIGN PATENT DOCUMENTS

| | | |
|---|---|---|
| JP | 07-214455 A | 8/1995 |
| JP | 8155780 A | 6/1996 |
| JP | 1110479 A | 1/1999 |
| JP | 3133056 U | 6/2007 |
| JP | 2010253628 A | 11/2010 |
| JP | 2011-025324 A | 2/2011 |
| KR | 10-2015-0019433 A | 2/2015 |

OTHER PUBLICATIONS

English Abstract and Machine Translation for Japanese Publication No. 2011-025324 A, published Feb. 10, 2011, 13 pages.
English Machine Translation for Japanese Publication No. 63-019993 U, published Feb. 9, 1988, 3 pages.
English Abstract and Machine Translation for Korean Publication No. 10-2015-0019433 A, published Feb. 25, 2015, 12 pages.
English Abstract and Machine Translation for Japanese Publication No. 2010-253628 A, published Nov. 11, 2010, 8 pgs.
English Abstract and Machine Translation for Japanese Publication No. 3133056 U, published Jun. 28, 2007, 10 pgs.
English Abstract and Machine Translation for Japanese Publication No. 11-010479 A, published Jan. 19, 1999, 6 pgs.
English Abstract and Machine Translation for Japanese Publication No. 08-155780 A, published Jun. 18, 1996, 7 pgs.
English Abstract and Machine Translation for Chinese Publication No. 101961842 A, published Feb. 2, 2011, 9 pgs.

* cited by examiner

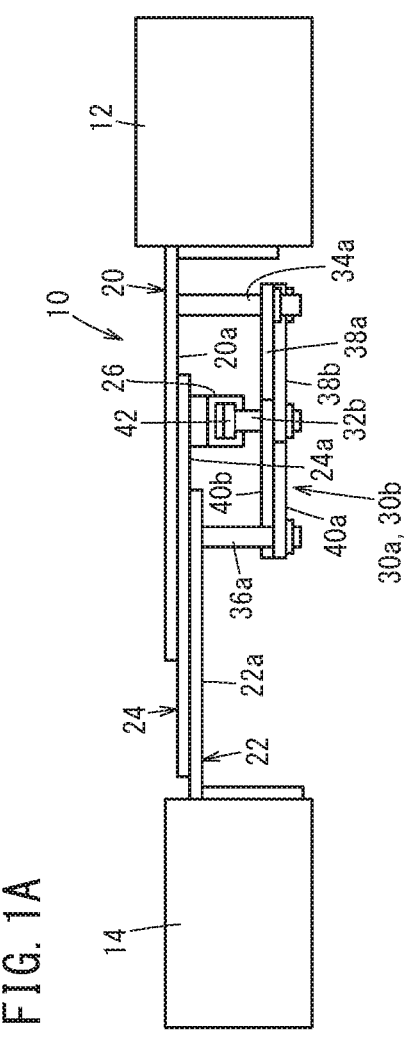
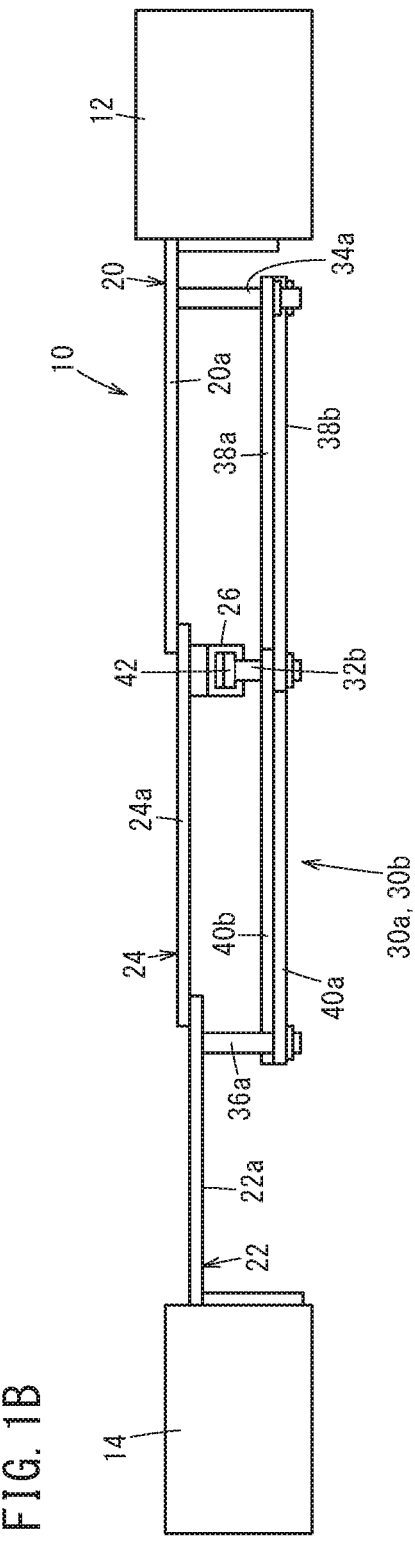
FIG. 1A
FIG. 1B

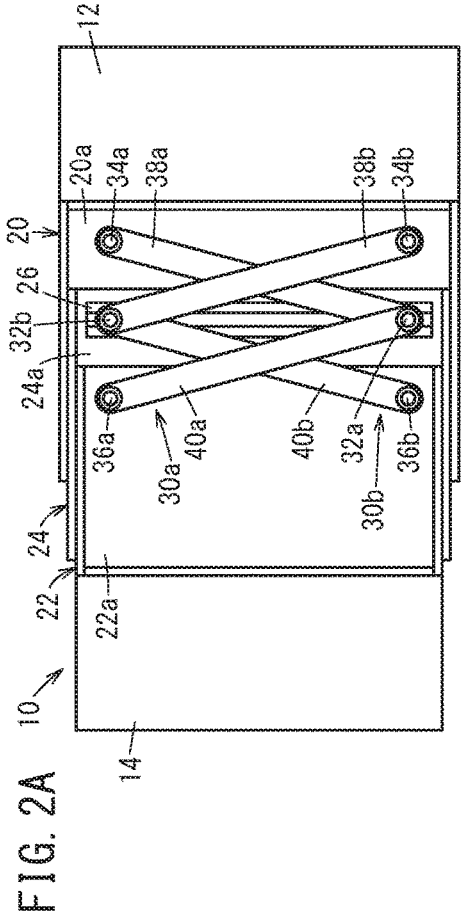

TELESCOPIC COVER

CROSS-REFERENCE TO RELATED APPLICATION

This application is based upon and claims the benefit of priority from Japanese Patent Application No. 2017-102397 filed on May 24, 2017, the contents of which are incorporated herein by reference.

BACKGROUND OF THE INVENTION

Field of the Invention

The present invention relates to a telescopic cover for covering a guide part that guides a movable portion in an industrial machine.

Description of the Related Art

Japanese Utility Model Registration No. 3133056 discloses a telescopic cover in which the distal ends of pairs of straight rods connected by scissor hinges forming pantograph elements are engaged in guide rails that are laid in the direction perpendicular to a direction in which the protection panel expands.

SUMMARY OF THE INVENTION

In order to accommodate the pantograph elements within the width of the protection cover panels, it is necessary to make the pantograph elements narrower by shortening the length of the connecting rods. In the technique of Japanese Utility Model Registration No. 3133056, it is necessary to increase the number of pantograph elements in order to shorten the length of the connecting rods while securing the expansion and contraction moving distance. Hence, this configuration entails the problem that an increased number of protection cover panels are required.

The present invention has been devised to solve the above problem. It is therefore an object of the present invention to provide a telescopic cover capable of reducing the number of protection cover panels.

The aspect of the invention resides in a telescopic cover for covering a guide portion for guiding a movable part of an industrial machine, comprising: a first fixed cover panel fixed to the movable part to move together with the movable part; a second fixed cover panel fixed to the fixed part of the industrial machine; a movable cover panel disposed between the first fixed cover panel and the second fixed cover panel and configured to overlap with the first fixed cover panel and the second fixed cover panel; a guide rail laid on the movable cover panel and oriented in the direction perpendicular to the moving direction of the movable part; and first and second V-shaped link structures, which each include two link arms, a movable pin configured to be movable along the guide rail and rotatably support the two link arms at one end thereof, a first fixed pin fixed to the first fixed cover panel and configured to rotatably support the other end of the link arm and a second fixed pin fixed to the second fixed cover panel and configured to rotatably support the other end of the link arm, wherein the first V-shaped link structure and the second V-shaped link structure are arranged in an overlapping manner such that the first fixed pin and the second fixed pin of the first V-shaped link structure are positioned relative to the movable pin to one side with respect to the direction parallel to the longitudinal direction of the guide rail while the first fixed pin and the second fixed pin of the second V-shaped link structure are positioned relative to the movable pin to the side opposite to that in the first V-shaped link structure.

According to the present invention, the number of protection cover panels can be reduced.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1A is a schematic side sectional view of a telescopic cover, showing a state in which the telescopic cover is retracted;

FIG. 1B is a schematic side sectional view of the telescopic cover, showing a state in which the telescopic cover is expanded; and FIG. 2A is a schematic rear view of the telescopic cover, showing a state in which the telescopic cover is retracted; and FIG. 2B is a schematic rear view of the telescopic cover, showing a state in which the telescopic cover is expanded.

DESCRIPTION OF THE PREFERRED EMBODIMENTS

First Embodiment

[Configuration of Telescopic Cover]

FIG. 1A is a schematic side sectional view of a telescopic cover 10 of the present embodiment, showing a state in which the telescopic cover 10 is retracted. FIG. 1B is a schematic side sectional view of the telescopic cover 10 of the present embodiment, showing a state in which the telescopic cover 10 is expanded. FIG. 2A is a schematic rear view of the telescopic cover 10 of the present embodiment, showing a state in which the telescopic cover 10 is retracted. FIG. 2B is a schematic rear view of the telescopic cover 10 of the present embodiment, showing a state in which the telescopic cover 10 is expanded.

The telescopic cover 10 of the present embodiment covers a guide portion for guiding a movable part 12 of an industrial machine such as a lathe, a milling machine, a machining center, a turning center, an electrical discharge machine, an injection molding machine, etc., to prevent entrance of cutting chips and other swarf into the guiding portion. The telescopic cover 10 includes a first fixed cover panel 20 fixed to the movable part 12 of the industrial machine and moving together with the movable part 12, a second fixed cover panel 22 fixed to a fixed part 14 of the industrial machine and a movable cover panel 24 disposed between the first fixed cover panel 20 and the second fixed cover panel 22 and overlapped with the first fixed cover panel 20 and the second fixed cover panel 22. The first fixed cover panel 20, the movable cover panel 24 and the second fixed cover panel 22 are arranged in a nested manner.

The telescopic cover 10 is formed so as to be able to expand and contract as a whole as the movable part 12 moves in linkage with two V-shaped link structures 30a and 30b. The V-shaped link structures 30a and 30b have movable pins 32a and 32b, first fixed pins 34a and 34b, second fixed pins 36a and 36b, first link arms 38a and 38b, and second link arms 40a and 40b, respectively.

Arranged on the rear surface of a top plate 24a of the movable cover panel 24 is a guide rail 26 that is oriented in a direction perpendicular to the expansion and contraction direction of the telescopic cover 10. The movable pins 32a and 32b are engaged with the guide rail 26 so as to be movable along the guide rail 26. When the telescopic cover 10 is viewed in the state of FIGS. 2A and 2B, the movable pin 32a is disposed on the lower side of the movable pin 32b. Provided at each of the engaging portions of the movable pins 32a and 32b with the guide rail 26 is a roller 42 that abuts the guide rail 26 and rotates relative to the movable pin 32a, 32b.

On the rear side of a top plate 20a of the first fixed cover panel 20, the first fixed pins 34a and 34b are arranged and fixed apart from each other with respect to the direction parallel to the longitudinal direction of the guide rail 26. When the telescopic cover 10 is viewed in the state of FIGS. 2A and 2B, the first fixed pin 34a is arranged above the first fixed pin 34b.

On the rear side of a top plate 22a of the second fixed cover panel 22, the second fixed pins 36a and 36b are arranged and fixed apart from each other with respect to the direction parallel to the longitudinal direction of the guide rail 26. When the telescopic cover 10 is viewed in the state of FIGS. 2A and 2B, the second fixed pin 36a is arranged above the second fixed pin 36b.

The first link arm 38a and the second link arm 40a are rotatably supported at one end by the movable pin 32a. The other end of the first link arm 38a is rotatably supported by the first fixed pin 34a. The other end of the second link arm 40a is rotatably supported by the second fixed pin 36a.

The first link arm 38b and the second link arm 40b are rotatably supported at one end on the movable pin 32b. The other end of the first link arm 38b is rotatably supported by the first fixed pin 34b. The other end of the second link arm 40b is rotatably supported by the second fixed pin 36b.

Thus, the V-shaped link structure 30a is configured such that the first link arm 38a and the second link arm 40a form a V-shape, and the V-shaped link structure 30b is configured such that the first link arm 38b and the second link arm 40b form a V-shape. The V-shaped link structures 30a and 30b are oriented such that the first fixed pin 34a and the second fixed pin 36a are positioned relative to the movable pin 32a to one side with respect to the direction parallel to the longitudinal direction of the guide rail 26, whereas the first fixed pin 34b and the second fixed pin 36b are positioned relative to the movable pin 32b, to the side opposite to that in the first V-shaped link structure 30a. Further, the V-shaped link structure 30a and the V-shaped link structure 30b are disposed so as to overlap each other with respect to the direction parallel to the longitudinal direction of the guide rail 26. Further, the V-shaped link structure 30a and the V-shaped link structure 30b are arranged such that the first link arm 38a and the first link arm 38b intersect with each other and the second link arm 40a and the second link arm 40b intersect with each other.

Operation and Effect

In the telescopic cover 10 of the present embodiment, the movable pins 32a, 32b of the V-shaped link structures 30a, 30b move along the guide rail 26 that is fixed on the movable cover panel 24 and oriented in the direction perpendicular to the expansion and contraction direction of the telescopic cover 10. Further, in the telescopic cover 10, the first fixed pins 34a, 34b of the V-shaped link structures 30a, 30b are arranged apart from each other with respect to the direction parallel to the longitudinal direction of the guide rail 26 and fixed to the first fixed cover panel 20. In the telescopic cover 10, the second fixed pins 36a, 36b of the V-shaped link structures 30a, 30b are arranged apart from each other with respect to the direction parallel to the longitudinal direction of the guide rail 26 and fixed to the second fixed cover panel 22. This configuration makes it possible to prevent the cover panels from meandering when the telescopic cover 10 is expanded and contracted.

Further, the telescopic cover 10 according to the present embodiment is constructed such that the V-shaped link structure 30a and the V-shaped link structure 30b overlap each other with respect to the direction parallel to the longitudinal direction of the guide rail 26. With this configuration, the total width of the V-shaped link structures 30a and 30b in the direction parallel to the longitudinal direction of the guide rail 26 can be reduced. Therefore, it is possible to lengthen the first link arms 38a, 38b and the second link arms 40a, 40b and reduce the number of the cover panels 20, 22, 24 for the extension/contraction distance of the telescopic cover 10.

Still more, in the telescopic cover 10 of the present embodiment, rollers 42 abutting the guide rail 26 and rotating relative to the movable pins 32a, 32b are arranged in the engaging portions of the movable pins 32a, 32b with the guide rail 26. This makes it possible to suppress the resistance between the guide rail 26 and the movable pins 32a, 32b and smooth the movement of the telescopic cover 10 in the expansion and contraction direction.

Although certain preferred embodiments of the present invention have been shown and described in detail, it should be understood that various changes and modifications may be made therein without departing from the scope of the appended claims.

Technical Ideas Obtained from Embodiment

Technical ideas that can be grasped from the above embodiment will be described below.

A telescopic cover (10) for covering a guide portion for guiding a movable part (12) of an industrial machine, includes: a first fixed cover panel (20) fixed to the movable part (12) to move together with the movable part (12); a second fixed cover panel (22) fixed to the fixed part (14) of the industrial machine; a movable cover panel (24) disposed between the first fixed cover panel (20) and the second fixed cover panel (22) and configured to overlap with the first fixed cover panel (20) and the second fixed cover panel; a guide rail (26) laid on the movable cover panel (24) and oriented in the direction perpendicular to a moving direction of the movable part (12); and first and second V-shaped link structures (30a, 30b), which each include two link arms (38a and 40a, 38b and 40b), a movable pin (32a, 32b) configured to be movable along the guide rail (26) and rotatably support the two link arms (38a and 40a, 38b and 40b) at one end thereof, a first fixed pin (34a, 34b) fixed to the first fixed cover panel (20) and configured to rotatably support the other end of the link arm (38a, 38b) and a second fixed pin (36a, 36b) fixed to the second fixed cover panel (22) and configured to rotatably support the other end of the link arm (40a, 40b). In this arrangement, the first V-shaped link structure (30a) and the second V-shaped link structure (30b) are arranged in an overlapping manner such that the first fixed pin (34a) and the second fixed pin (36a) of the first V-shaped link structure (30a) are positioned relative to the movable pin (32a) to one side with respect to the direction parallel to the longitudinal direction of the guide rail (26)

while the first fixed pin (34*b*) and the second fixed pin (36*b*) of the second V-shaped link structure (30*b*) are positioned relative to the movable pin (32*b*) to a side opposite to that in the first V-shaped link structure (30*a*). This makes it possible to lengthen the link arms (38*a*, 38*b*, 40*a*, 40*b*) and reduce the number of the cover panels (20, 22, 24) for the extension/contraction distance of the telescopic cover (10).

In the above telescopic cover (10), the movable pins (32*a*, 32*b*) each include a roller (42) that abuts the guide rail (26) and rotates relative thereto. As a result, it is possible to suppress the resistance between the guide rail (26) and the movable pins (32*a*, 32*b*) and smooth the movement of the telescopic cover (10) in the expansion and contraction direction.

What is claimed is:

1. A telescopic cover for covering a guide portion for guiding a movable part of an industrial machine, comprising:
    a first fixed cover panel fixed to the movable part and configured to move together with the movable part;
    a second fixed cover panel fixed to a fixed part of the industrial machine;
    a movable cover panel disposed between the first fixed cover panel and the second fixed cover panel and configured to overlap with the first fixed cover panel and the second fixed cover panel;
    a guide rail located on the movable cover panel and oriented in a direction perpendicular to the moving direction of the movable part; and
    first and second V-shaped link structures, which each include two link arms, a movable pin configured to be movable along the guide rail and rotatably support the two link arms at one end of each of the two link arms, each first and second V-shaped link structure having a first fixed pin fixed to the first fixed cover panel and configured to rotatably support one of the link arms at an end opposite to the end with the movable pin and a second fixed pin fixed to the second fixed cover panel and configured to rotatably support the other of the link arms at an end opposite to the end with the movable pin,
    wherein when the telescopic cover is viewed in a state that the positions of the first fixed pin and the second fixed pin of the first v-shaped link structure is above the position of the first fixed pin and the second fixed pin of the second v-shaped link structure, the first V-shaped link structure and the second V-shaped link structure are arranged in an overlapping manner such that the first fixed pin and the second fixed pin of the first V-shaped link structure are positioned higher than its respective movable pin while the first fixed pin and the second fixed pin of the second V-shaped link structure are positioned lower than its respective movable pin.

2. The telescopic cover according to claim 1, wherein each movable pin includes a roller that abuts the guide rail and rotates relative to the guide rail.

* * * * *